(12) United States Patent
Budde et al.

(10) Patent No.: US 7,616,619 B2
(45) Date of Patent: Nov. 10, 2009

(54) TDMA COMMUNICATION SYSTEM

(75) Inventors: Wolfgang Otto Budde, Aachen (DE); Peter Fuhrmann, Aachen (DE)

(73) Assignee: NXP B.V., Eindhoven (NL)

( * ) Notice: Subject to any disclaimer, the term of this patent is extended or adjusted under 35 U.S.C. 154(b) by 1005 days.

(21) Appl. No.: 10/276,198

(22) PCT Filed: Mar. 14, 2002

(86) PCT No.: PCT/IB02/00782

§ 371 (c)(1),
(2), (4) Date: Nov. 12, 2002

(87) PCT Pub. No.: WO02/082744

PCT Pub. Date: Oct. 17, 2002

(65) Prior Publication Data

US 2003/0142630 A1    Jul. 31, 2003

(30) Foreign Application Priority Data

Mar. 16, 2001   (DE) .................................. 101 12 695

(51) Int. Cl.
*H04J 3/00*      (2006.01)
(52) U.S. Cl. ....................................... 370/345; 370/252

(58) Field of Classification Search ................. 370/242, 370/252, 328, 329, 336, 337, 338, 345, 347
See application file for complete search history.

(56) References Cited

U.S. PATENT DOCUMENTS

| | | | | |
|---|---|---|---|---|
| 6,112,092 A * | 8/2000 | Benveniste | .................. | 455/450 |
| 6,115,610 A * | 9/2000 | Goetz et al. | .................. | 455/450 |
| 6,119,005 A * | 9/2000 | Smolik | ....................... | 455/436 |
| 6,501,764 B1 * | 12/2002 | Fudatate et al. | ............. | 370/445 |
| 6,714,523 B2 * | 3/2004 | Zeira et al. | ................... | 370/320 |
| 6,741,579 B1 * | 5/2004 | Choi et al. | ................... | 370/337 |
| 6,930,993 B1 * | 8/2005 | Hamada et al. | ............. | 370/347 |

\* cited by examiner

*Primary Examiner*—Ricky Ngo
*Assistant Examiner*—Christine Ng

(57) ABSTRACT

The invention relates to a communication system with at least two communication nodes for the transmission of information via a common transmission medium in a time division multiplex process.

Figure 1:
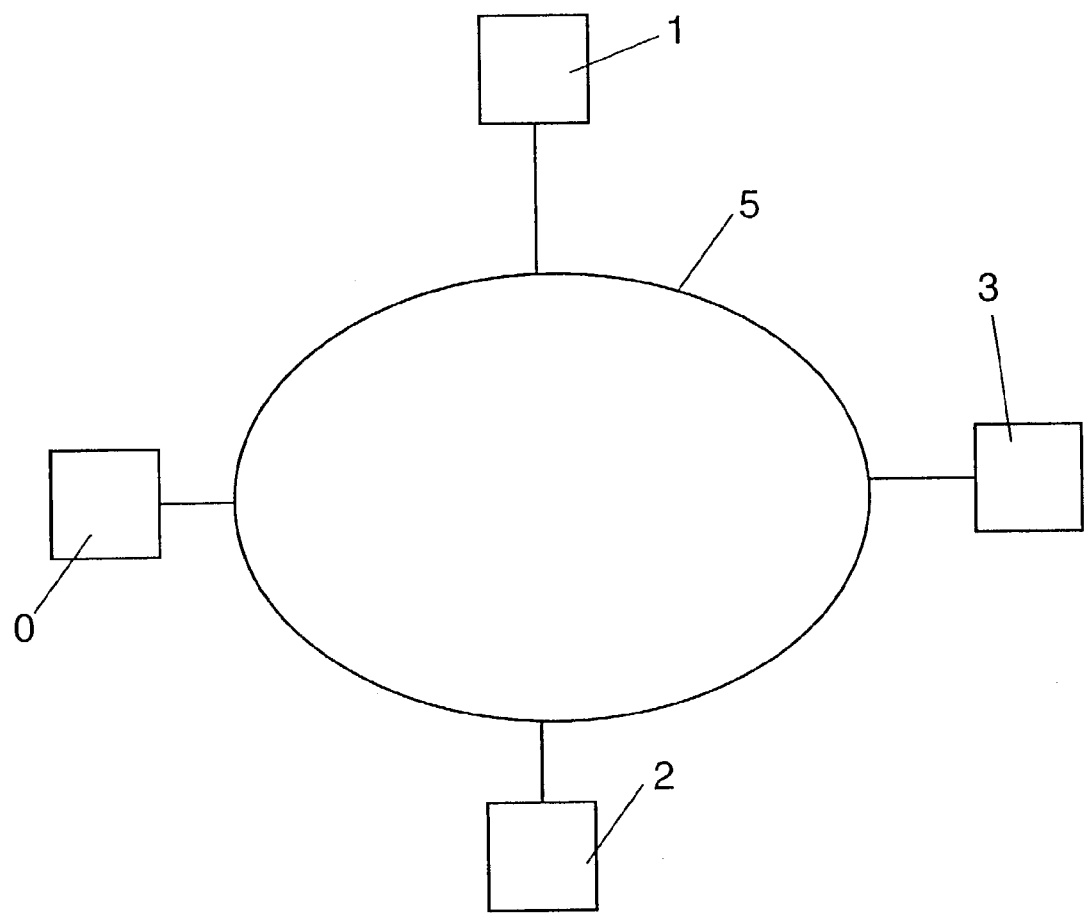

During the system start, at least one node is provided for monitoring whether a first signal which utilizes at least one slot in a regular manner is already present in the transmission medium. If a first signal is present, said node is designed for testing this first signal as to its integrity and said node is designed for sending a second signal in the case of an incorrect integrity of the first signal, and a programmable position within the time frame given by the second signal is allocated to the time slot utilized by the first signal.

20 Claims, 2 Drawing Sheets

TDMA COMMUNICATION SYSTEM

The invention relates to a communication system with at least two communication nodes for the transmission of information via a common transmission medium in a time division multiplex process.

Such a communication system is known from, for example, the VDI report no. 1547, 2000, pp. 23 ff. (FlexRay Communication System).

A time division multiplex process for controlling the access of various communication nodes to a common transmission medium is provided in this communication system.

Messages are sent by all communication nodes in a frame structure in a repetitive pattern corresponding to the frame cycle time. Depending on the protocol used, these messages may be of various structures, i.e. for example as special symbols or signal samples, which themselves already represent the information to be transmitted, or alternatively they may be formed as messages with defined format elements which may comprise information relevant to the protocol but also application data.

Certain regions of the frame structure are additionally reserved for other access procedures such as, for example, for the random access liable to collisions.

When the system is started, the nodes are activated in random sequence, for example generated by the unpredictable order in which the power is supplied to each of them. Each activated node in the known system observes the communication medium by a conventional technique for a certain period and tests whether a frame structure was already established on the basis of which it can synchronize itself. If it finds at least one regularly utilized time slot or a specific pattern of utilized time slots, it will test the message present therein for its integrity, for example by means of a check total. The activated node interprets this message so as to identify the position of its own transmission slot therein from its temporal position and from the contents, the latter being, for example, an unequivocal identifier which indicates the temporal position of the regularly utilized time slot within the frame structure.

If the respective node does not find a regularly used time slot in the transmission medium, it will start sending a message in the repetition rate given by the cycle time in a regular manner, thus as it were marking its own time slot. Other nodes may then synchronize themselves with this message.

The special case in which two or more nodes send their first message simultaneously will lead to a collision, which can be dealt with by one of several known methods.

Now if an incorrect node starts sending an invalid message, other nodes will be incapable of synchronizing themselves with this message. On the other hand, however, the medium is utilized at regular intervals, so that the other nodes remain in their waiting position. The system is blocked by the incorrect node in that case.

To prevent an incorrect node from permanently obstructing the entire system start through the repeated transmission of invalid messages which block the medium, it is known to define a time period or a maximum number of attempts within the system start algorithm within which a synchronized communication must be established. If this is not achieved, the transmitting node must become inactive, for example for a defined period of time, so that another node can carry out the system start through the provision of the communication frame. Such a solution, based on a time-out interval which serves to leave a state once established on the basis of a condition which is not fulfilled, is described, for example, for the channel access method ALOHA in "Wireless Information Networks" by K. Pahlavan & A. Levesque, 1995 (ISPN: 0-471-10607-0), pp. 464 ff. It is a precondition in this solution, in which accordingly an incorrectly operating node should switch itself off or remove itself from the medium, that said node is still capable of performing a security operation although it exhibits an incorrect behavior in the network.

It is an object of the invention to provide an alternative communication system which safeguards a reliable system start also in the case of an incorrectly transmitting node.

According to the invention, this object is achieved by means of a communication system wherein at least one node is provided for monitoring during the system start whether a first signal which utilizes at least one slot in a regular manner is already present in the transmission medium, wherein said node is designed, if a first signal is present, for testing this first signal as to its integrity, and wherein said node is designed for sending a second signal in the case of an incorrect integrity of the first signal, and a programmable position within the time frame given by the second signal is allocated to the time slot utilized by the first signal.

At least one communication node tests during the system start whether a regularly utilized time slot is present in the transmission medium. If this is the case, the node tests this signal for its integrity, i.e. it tries to interpret this activity as a message. If this is not possible, for example because of an erroneous check total, a coding error, or some other circumstance, the node will identify this time slot as incorrect.

The node thereupon constructs the time frame structure for itself in such a manner that the incorrectly utilized time slot will occupy a defined position. Finally, the node starts sending its message in the time slot provided for it within the new time frame structure. Other nodes in the network can now synchronize themselves with the message correctly sent by this node.

The main advantage of this communication network is the avoidance of a blocking of the entire communication system by one incorrect node.

The particular advantage over an error treatment by the erroneous node itself follows from the fact that an independent unit carries out the error recognition and treatment. This unit is formed by at least one participating node.

Advantageously, each node of the communication system can be provided for the error treatment. In that case, each node individually tests and judges the situation in the transmission medium. The reliability of the erroneous situation being recognized and dealt with in a defined manner is enhanced thereby.

If several nodes in this advantageous embodiment simultaneously recognize the presence of an incorrect time slot, they will all define the time frame structure anew in parallel and will attempt to provide this as the general time frame through the transmission of their own time slots. Collisions in this phase may be dealt with in a known manner exactly as in the error-free starting operation. The method known, for example, from the VDI report no. 1547, 2000, pp. 23 ff. for collision treatment in FlexRay communication systems may be used for this.

It is avoided in addition that the incorrect time slot interferes with a given, for example particularly critical position in the time frame structure. Instead, it is shifted to a previously defined, fixed position in the time frame structure. Finally, the functional loss of the system involved in the incorrect time slot is minimized, for example in that the incorrect time slot is shifted to the message position of lowest priority in the system.

The case in which the first, incorrectly transmitting node itself reinstates the transmission process in the original position after the error recognition and error treatment by a second node, i.e. the provision of a new, general time frame structure by a second node, is merely a favorable special case. Since the error hypothesis arises from a first node which has an overall incorrect operation, the method proposed relates in particular to the case in which the first, incorrectly transmitting node occupies at least one time slot subsequent to the original moment in time.

The invention may be advantageously applied to all autonomously starting communication systems.

The communication system proposed is particularly suitable for applications which are critical as to reliability and in which a reliable start of the communication system must be safeguarded also in the presence of at least one incorrect node, such as, for example, in an automobile, in an airplane, in the control of industrial installations, etc.

In addition, the invention is useful wherever a system must be capable of starting without human intervention also in the case of an error; applications in badly accessible locations or communication networks distributed over wide areas are relevant here.

In the advantageous embodiment of the invention as claimed in claim 2, a special spare time slot is provided which serves only for accommodating an incorrect time slot, if this should occur, in the time frame such that the remaining nodes can communicate without disturbance.

In the advantageous embodiment of the invention as claimed in claim 3, no dedicated spare time slot is used, but the incorrect time slot is positioned in the time slot reserved for messages having the lowest priority.

In the advantageous embodiment of the invention as claimed in claim 4, the incorrect time slot is positioned in a region of the time frame which renders possible a dynamic access of the nodes of the communication system by means of waiting times and message priorities. Such a dynamic time slot is provided, for example, in the FlexRay communication system described in more detail in the VDI report no. 1547, 2000. In such a system with dynamic access possibilities, the incorrect time slot can be preferably positioned at the start of the dynamic time slot, so that the remainder of this time slot is furthermore available for the dynamic management of messages. Alternatively, the incorrect time slot may be positioned at the end of this dynamic time slot, thus merely interfering with the message having the lowest priority.

The advantageous embodiment of the invention as claimed in claim 5 relates to communication systems with random, collision-prone access during a dedicated time slot. It is advantageous in such a system to position the incorrect time slot in that region of the time frame which is provided for the random, collision-prone access, because collisions are to be taken into account anyway there, and accordingly processes for dealing with collisions are provided by the communication system already.

In the advantageous embodiment of the invention as claimed in claim 6, the node which has become the determining node in the determination of the overall time frame carries out a corresponding characterization of its message. It is communicated to the entire communication system, and in particular to the other nodes, that an incorrectly transmitting node was recognized in the system and that the time slot identified as erroneous has been newly positioned. As a result, a node disadvantaged by the new positioning of the erroneous time slot can take suitable countermeasures, for example by blocking the time slot allotted to it. A possible counter measure is, for example, to carry out a controlled transition of the entire system into a protected state in which it is safeguarded that at least a limited operation can be maintained in the relevant application and/or that defective conditions are avoided in the relevant application.

More complicated reactions, however, controlled by corresponding control applications are also possible. The node interfered with by the new positioning of the erroneous time slot could be diverted dynamically with its transmission window into a reserved region within the new time frame. For this purpose, however, it should be indicated to the relevant node that an erroneous node was recognized and that the time slot of this erroneous node was newly positioned in a time frame defined by another node. A characterization could be achieved, for example, by defined elements within the message format or alternatively in the message data themselves.

Claim 7 relates to a method according to the invention, claim 8 to a TDMA signal according to the invention, and claim 9 to a motor vehicle with a communication system according to the invention.

Figures 2, 3, 4:
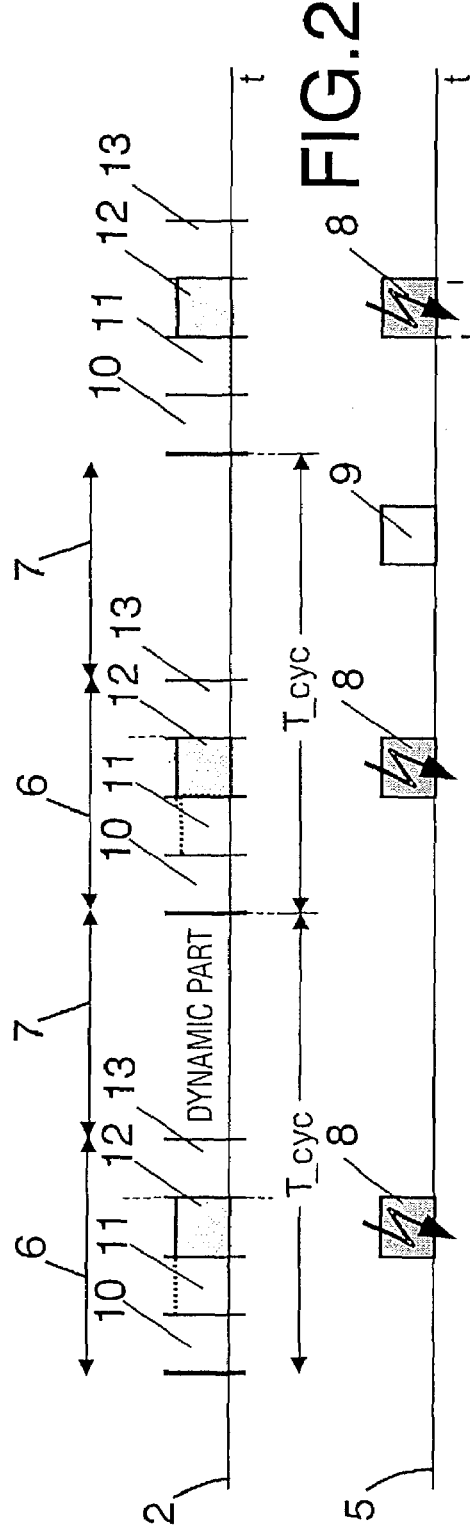

A few diagrammatically depicted embodiments of the invention will now be explained in more detail below with reference to the drawing which comprises FIGS. 1 to 4, in which:

FIG. 1 shows a communication system with four nodes and a common transmission medium, FIG. 2 shows the time sequence of a TDMA signal transmitted by a first node of the communication system with a time frame which has a static part and a dynamic part, FIG. 3 shows the time sequence of the signals occurring in the transmission medium of the communication system in the case of a system start, and FIG. 4 shows a second signal transmitted by a second node of the communication system with a time frame shifted with respect to the first signal.

FIG. 1 shows a communication system with four communication nodes 0, 1, 2, and 3. The four communication nodes 0 to 3 are each coupled to a common transmission medium 5. The common transmission medium 5 may be, for example, a bus system of a motor vehicle, in particular also a communication network operating in accordance with the FlexRay protocol. The common transmission medium 5 is utilized by the four communication nodes in a time division multiplex process.

FIG. 2 shows the time sequence of a TDMA signal transmitted by the node 2 of the communication system. The time frame of the TDMA signal comprises a static part 6 and a dynamic part 7. The static part 6 has four time slots 10, 11, 12, and 13. The dynamic part 7 follows the former. The static part 6 and the dynamic part 7 are repeated periodically in accordance with the frame cycle time T_cyc. The time slot 10 of the static part 6 is provided for the node 0 of the communication system for the purpose of transmission via the transmission medium 5. Similarly, the time slots 11, 12, and 13 are reserved for the nodes 1, 2, and 3 of the communication system.

The dynamic part 7 is available for providing a flexible, dynamic accessing of the individual nodes 0 to 3. Such a dynamic time slot is provided, for example, in the FlexRay communication system as described in more detail in the VDI report no. 1547, 2000.

FIG. 3 shows by way of example the time sequence of the signals occurring in the transmission medium 5 of the communication system in the case of a system start with a node 2 transmitting incorrect signals and a node 3 which reacts to said incorrect, periodically transmitted signals.

First the node 2 sends a signal 8 via the transmission medium 5 at regular intervals in the time slot 12 provided for this node. The signal 8 is affected by an error, i.e. it cannot be interpreted as a message by the other nodes 0, 1, and 3. This may be the case, for example, because of an incorrect check total, a coding error, or some other cause. The erroneousness of the signal 8 is indicated with the flash symbol in FIG. 3.

FIG. 4 shows the behavior of the node 3 upon a system start. In the system start, the node 3 tests whether a signal correctly utilizing a time slot is already present in the transmission medium 5. The node 3 detects the signal 8 transmitted by the node 2 and tests it for integrity. The node 3 detects upon testing of the signal 8 that this signal 8 is incorrect, for example because of an incorrect check total. This is indicated with the arrow 15 in FIG. 4.

To render possible nevertheless a start of the communication system, the node 3 itself starts transmitting a signal 9 at regular intervals over the transmission medium 5. This is diagrammatically shown in FIG. 3.

The time frame provided by the signal 9 of the node 3 is shown in FIG. 4 again. The node 3 utilizes the static time slot 13 of the time frame reserved for it. The time frame provided by the node 3 is chosen such that the time slot utilized by the incorrect signal 8 occurs at the end of the dynamic range 7 of the time frame. This shifting of the time frame achieves that the incorrectly transmitting node 2 causes disturbances only in messages of lowest priority, which messages are provided for transmission at the end of the dynamic part 7 of the time frame. The node 3 now transmits a correct, error-free message in the static time slot 13 provided for it in accordance with the time frame shown in FIG. 4. The other nodes 0 and 1 of the communication system can synchronize themselves with the error-free signal transmitted by the node 3 and can utilize the time slots 10 and 11. A system start is thus safeguarded in spite of the incorrectly transmitting node 2.

Alternatively, the incorrect signal 8 of the node 2 may be positioned at the start of the dynamic part 7 of the time frame, so that the remainder of this dynamic part 7 is furthermore available for the dynamic management of messages.

The invention claimed is:

1. A communication system for the transmitting of information via a common transmission medium in a time division multiplex process, the system comprising:
    a node for monitoring a start up process of the system to determine whether a first signal from another node, which correctly utilizes at least one time slot of a time frame, wherein said time frame includes a static part and a dynamic part each having respective time slots, is present in the transmission medium, and for testing an integrity of the first signal when the first signal is present to determine whether the first signal transmitted during a static part of the time frame is incorrect,
    wherein when the first signal is determined to be incorrect, the node is configured to shift said at least one time slot utilized by the incorrect first signal to a programmable position of the dynamic part of the time frame, and to send a second signal utilizing at least one time slot in the static part of the time frame in a repeated periodic transmission of the static part and the dynnamic part of the time frame.

2. The communication system as claimed in claim 1, wherein the programmable position comprises a spare time slot, the incorrect first signal being allocated to the spare time slot.

3. The communication system as claimed in claim 1, wherein the programmable position comprises a region of the dynamic part of the time frame of the second signal having a low priority, the incorrect first signal being allocated to the low priority region.

4. The communication system as claimed in claim 1, wherein the programmable position comprises a region of the time frame of the second signal which is reserved for a dynamic access of the node, the incorrect first signal being allocated to the dynamic access region.

5. The communication system as claimed in claim 1, wherein the programmable position comprises a region of the time frame of the second signal which is reserved for a random, collision-prone access of the node, the incorrect first signal being allocated to the random collision-prone region.

6. The communication system as claimed in claim 1, wherein the second signal comprises information which indicates to at least one other node of the communication system that the first signal was detected in the transmission medium and determined to be incorrect.

7. A motor vehicle having a communication system as claimed in claim 1.

8. The communication system as claimed in claim 1, wherein the start up process comprises activating the node and at least one other node of the communication system.

9. The communication system as claimed in claim 1, wherein the node tests the integrity of the first signal by identifying an error causing the node to be unable to interpret the first signal as a message.

10. A method of starting a communication system comprising at least two communication nodes for transmitting information via a common transmission medium in a time division multiplex process, the method comprising:
    determining whether a first signal, which correctly utilizes at least one time slot in a first time frame, is present in the transmission medium while starting the system;
    when the first signal is present, testing an integrity of the first signal to determine whether the first signal is incorrect; and
    when the first signal is incorrect, sending a second signal through the transmission medium, the second signal utilizing a time slot within a static portion of a second time frame and the at least one time slot utilized by the incorrect first signal being allocated to a dynamic portion of the second time frame.

11. The method of claim 10, further comprising: synchronizing the at least two communication nodes based on the second signal.

12. The method of claim 10, wherein the dynamic portion of the second time frame, to which the at least one time slot utilized by the first signal is allocated, has a low priority.

13. The method of claim 10, wherein the dynamic portion of the second time frame, to which the at least one time slot utilized by the first signal is allocated, comprises a region reserved for random, collision-prone access of the at least two communication nodes of the communication system.

14. The method of claim 10, wherein testing the integrity of the first signal comprises checking for at least one of an incorrect check total and a coding error.

15. The method of claim 10, wherein the second signal is sent through the transmission medium at regular intervals.

16. A system for communicating over a common transmission medium in a time division multiplex process, the system comprising:
    a second node configured to receive a first signal in a first time frame structure from a first node, through the transmission medium, while the system is being started and to check an integrity of the first signal, the first time frame comprising a first static portion and a first dynamic portion, the first signal utilizing a first time slot in the first static portion;

wherein when the first signal is determined to be defective based on the integrity check, the second node constructs a second time frame structure and sends a second signal in the second time frame structure, the second time frame structure comprising a second static portion and a second dynamic portion, the second signal utilizing a second time slot in the second static portion and the first time slot utilized by the first signal being allocated to the second dynamic portion.

17. The system of claim 16, wherein the second signal is received by a third node during the start up of the system and synchronizes with at least the second node based on the second signal.

18. The system of claim 16, wherein the first time slot is allocated to an end portion of the second dynamic portion.

19. The system of claim 16, wherein the first time slot is allocated to a beginning portion of the second dynamic portion.

20. The system of claim 16, wherein the first node and the second node respectively send the first signal and the second signal at regular intervals.

* * * * *